United States Patent
Osaka

(10) Patent No.: US 10,558,220 B2
(45) Date of Patent: Feb. 11, 2020

(54) SELF-PROPELLED VEHICLE SYSTEM, SELF-PROPELLED VEHICLE, AND DRIVE CONTROL METHOD OF SELF-PROPELLED VEHICLE

(71) Applicant: KYOCERA Document Solutions Inc., Osaka (JP)

(72) Inventor: Haruya Osaka, Osaka (JP)

(73) Assignee: KYOCERA Document Solutions Inc., Tamatsukuri, CHou-ku, Osaka (JP)

( * ) Notice: Subject to any disclaimer, the term of this patent is extended or adjusted under 35 U.S.C. 154(b) by 135 days.

(21) Appl. No.: 15/879,959

(22) Filed: Jan. 25, 2018

(65) Prior Publication Data

US 2018/0217605 A1 Aug. 2, 2018

(30) Foreign Application Priority Data

Jan. 31, 2017 (JP) ................................. 2017-016353

(51) Int. Cl.
*G05D 1/02* (2006.01)

(52) U.S. Cl.
CPC ......... *G05D 1/0244* (2013.01); *G05D 1/0219* (2013.01); *G05D 1/0223* (2013.01); *G05D 1/0234* (2013.01)

(58) Field of Classification Search
None
See application file for complete search history.

(56) References Cited

U.S. PATENT DOCUMENTS

| | | | | |
|---|---|---|---|---|
| 4,566,032 A | * | 1/1986 | Hirooka | B66F 9/063 180/168 |
| 5,925,080 A | * | 7/1999 | Shimbara | G05D 1/0244 701/23 |
| 2009/0063052 A1 | * | 3/2009 | Onishi | G05D 1/0265 701/301 |
| 2011/0153135 A1 | * | 6/2011 | Kondo | G05D 1/0261 701/23 |

(Continued)

FOREIGN PATENT DOCUMENTS

| | | | |
|---|---|---|---|
| DE | 19516371 A1 * | 11/1996 | ............. B60L 15/00 |
| JP | 1987-001208 U | 1/1987 | |

(Continued)

*Primary Examiner* — Christian Chace
*Assistant Examiner* — Amelia J. I. Vorce
(74) *Attorney, Agent, or Firm* — IP Business Solutions, LLC

(57) ABSTRACT

The self-propelled vehicle system includes a drive line, a start marker, and a self-propelled vehicle. The self-propelled vehicle includes a plurality of drive line sensors arranged, in a direction intersecting with the travel direction of the self-propelled vehicle, at a wider range than a width of the drive line, a marker sensor that detects the start marker, and a control unit. After the start marker is detected by the marker sensor, the control unit nullifies the detection output of one group of the drive line sensors out of a plurality of groups that are formed by dividing all the drive line sensors, and in accordance with the detection output of another of the groups, the control unit makes the travel direction of the self-propelled vehicle follow the drive line branched towards a side of the another group, which is one of the two drive lines branched into two directions.

12 Claims, 15 Drawing Sheets

(56) References Cited

U.S. PATENT DOCUMENTS

| | | | | |
|---|---|---|---|---|
| 2012/0143427 A1* | 6/2012 | Hoffman | ............. | G06Q 10/087 701/23 |
| 2012/0191272 A1* | 7/2012 | Andersen | ............. | G06Q 10/087 701/2 |
| 2013/0302132 A1* | 11/2013 | D'Andrea | ............. | G06Q 10/08 414/807 |
| 2014/0058556 A1* | 2/2014 | Kawano | ............... | G05D 1/0234 700/216 |

FOREIGN PATENT DOCUMENTS

| | | |
|---|---|---|
| JP | 1988-052214 A | 3/1988 |
| JP | 1988-110917 U | 7/1988 |
| JP | 1994-309028 A | 11/1994 |
| JP | 5332952 B2 | 11/2013 |

* cited by examiner

SELF-PROPELLED VEHICLE SYSTEM, SELF-PROPELLED VEHICLE, AND DRIVE CONTROL METHOD OF SELF-PROPELLED VEHICLE

INCORPORATION BY REFERENCE

This application claims priority to Japanese Patent Application No. 2017-016353 filed on Jan. 31, 2017, the entire contents of which are incorporated by reference herein.

BACKGROUND

The present disclosure relates to a self-propelled vehicle system that makes a self-propelled vehicle travel along a drive line laid on a road surface and the self-propelled vehicle, and a drive control method of the self-propelled vehicle, particularly to the travel control of the self-propelled vehicle when the drive line branches into two directions.

For example, a technology has been disclosed wherein a guide path tape is stuck on a road surface, multiple detection elements are arranged on a vehicle in a direction intersecting the guide path tape, and a travel direction of the vehicle is adjusted such that a deviation between a center of each of the detecting elements and a center of the guide path tape becomes 0 and the vehicle is made to travel along the guide path tape. In this technology, in a case where the guide path tape branches to left and right, the center of each of the detection elements is offset to match the center of the detection elements to either the left or right edge of the guide path tape, and the vehicle is caused to run along an edge of the guide path tape to which the center of each of the detection elements was aligned.

SUMMARY

As one aspect of the present disclosure, a technology that further improves the above-mentioned technology is proposed.

A self-propelled vehicle system of one aspect of the present disclosure includes a drive line, a start marker, and a self-propelled vehicle. The drive line is laid on a road surface and branches from a first direction into a second direction and a third direction. The start marker is arranged along the drive line at an upstream side of a travel direction with respect to a point where the drive line branches into the second direction and the third direction. The self-propelled vehicle runs in the travel direction along the drive line and changes the travel direction. The self-propelled vehicle includes a drive section, a plurality of drive line sensors, a marker sensor, and a control unit. The drive section runs the self-propelled vehicle. The plurality of drive line sensors is arranged, in a direction intersecting with the travel direction of the self-propelled vehicle, at a wider range than a width of the drive line, and each detects the drive line. The marker sensor detects the start marker arranged along the drive line at the upstream side of the travel direction with respect to the point where the drive line branches into the second direction and the third direction. The control unit controls the drive section in accordance with a detection output of each of the drive line sensors and the marker sensor. Before the start marker is detected by the marker sensor, in accordance with the detection output of each of the drive line sensors, the control unit causes the drive section to make the travel direction of the self-propelled vehicle follow the drive line of the first direction. After the start marker is detected by the marker sensor, the control unit nullifies the detection output of the drive line sensors forming a group at one end side, the group being one of groups formed by dividing all the drive line sensors in the intersecting direction, and in accordance with the detection output of a group other than the group at the one end side, the control unit causes the drive section to make the travel direction of the self-propelled vehicle follow the drive line branched towards a side of the group other than the group at the one end side, the drive line to be followed being one of the two drive lines branched into the second direction and the third direction.

A self-propelled vehicle of another aspect of the present disclosure runs along a drive line that is laid on a road surface and branches from a first direction into a second direction and a third direction. The self-propelled vehicle includes a drive section, a plurality of drive line sensors, a marker sensor, and a control unit. The drive section runs the self-propelled vehicle. The plurality of drive line sensors is arranged, in a direction intersecting with the travel direction of the self-propelled vehicle, at a wider range than a width of the drive line, and each detects the drive line. The marker sensor detects a start marker arranged along the drive line at an upstream side of the travel direction with respect to a point where the drive line branches into the second direction and the third direction. The control unit controls the drive section in accordance with a detection output of each of the drive line sensors and the marker sensor. Before the start marker is detected by the marker sensor, in accordance with the detection output of each of the drive line sensors, the control unit causes the drive section to make the travel direction of the self-propelled vehicle follow the drive line of the first direction. After the start marker is detected by the marker sensor, the control unit nullifies the detection output of the drive line sensors forming a group at one end side, the group being one of groups formed by dividing all the drive line sensors in the intersecting direction, and in accordance with the detection output of a group other than the group at the one end side, the control unit causes the drive section to make the travel direction of the self-propelled vehicle follow the drive line branched towards a side of the group other than the group at the one end side, the drive line to be followed being one of the two drive lines branched into the second direction and the third direction.

A drive control method of a self-propelled vehicle of still another aspect of the present disclosure uses: a drive line that is laid on a road surface and branches from a first direction into a second direction and a third direction; a start marker arranged along the drive line at an upstream side of a travel direction with respect to a point where the drive line branches into the second direction and the third direction; and a self-propelled vehicle that runs in the travel direction along the drive line and changes the travel direction. The self-propelled vehicle includes: a drive section that runs the self-propelled vehicle; a plurality of drive line sensors that is arranged, in a direction intersecting with the travel direction of the self-propelled vehicle, at a wider range than a width of the drive line, and each detects the drive line; a marker sensor that detects the start marker; and a control unit that controls the drive section in accordance with a detection output of each of the drive line sensors and the marker sensor. The drive control method includes: a first step of causing the drive section to make the travel direction of the self-propelled vehicle follow the drive line of the first direction in accordance with the detection output of each of the drive line sensors before the start marker is detected by the marker sensor; and a second step of nullifying, after the start marker is detected by the marker sensor, the detection output of the drive line sensors forming a group at one end side, the group being one of groups formed by dividing all the drive line sensors in the intersecting direction, and in accordance with the detection output of a group other than the group at the one end side, causing the drive section to make the travel direction of the self-propelled vehicle follow the drive line branched towards a side of the group other than the group at the one end side, the drive line to be followed being one of the two drive lines branched into the second direction and the third direction.

DETAILED DESCRIPTION

A self-propelled vehicle system, a self-propelled vehicle, and a drive control method of a self-propelled vehicle according to the first embodiment of the present disclosure are explained with reference to the drawings.

Figure 1:
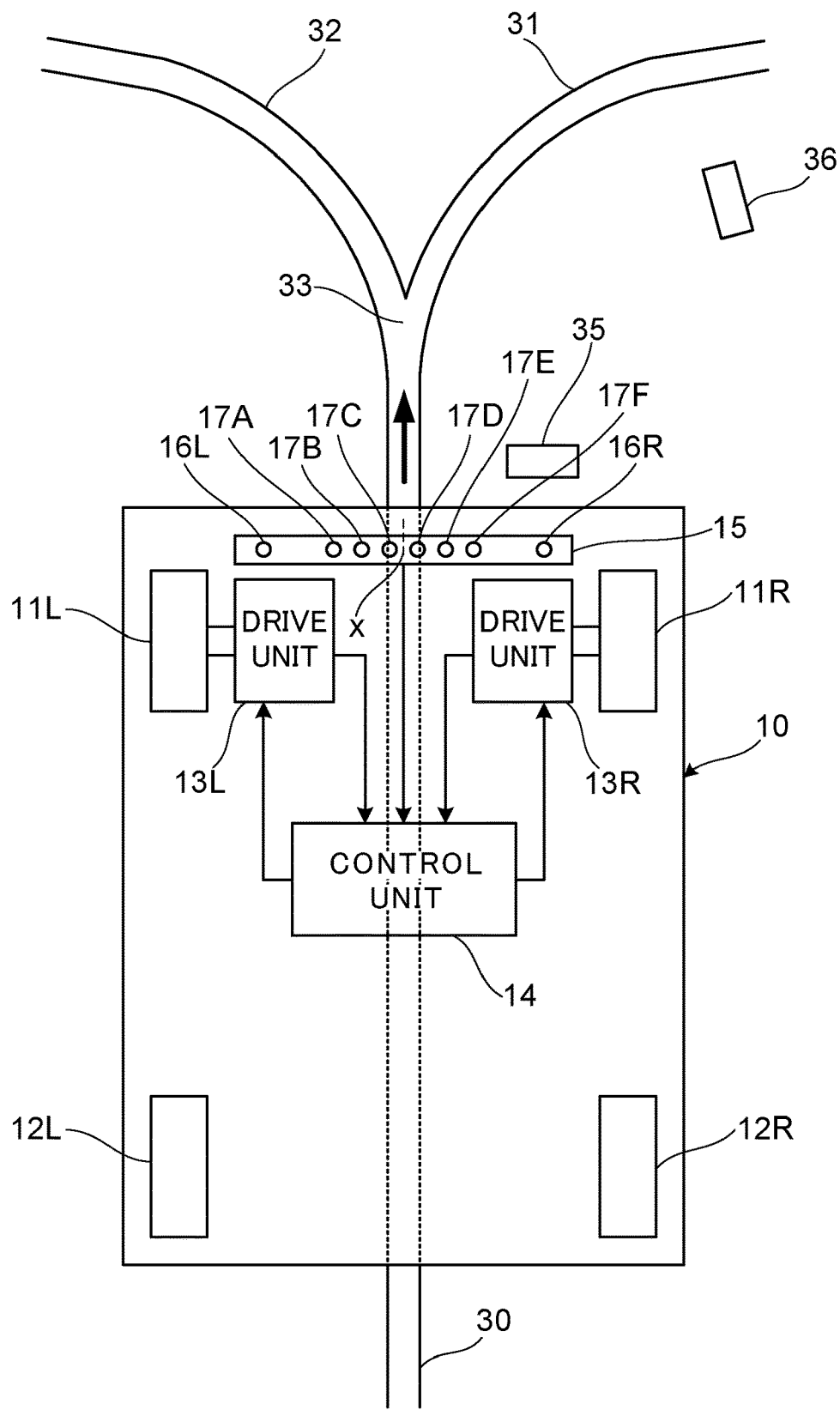
FIG. 1 is a schematic drawing showing a self-propelled vehicle system in accordance with a first embodiment of the present disclosure.

FIG. 1 is a schematic drawing showing the self-propelled vehicle system in according to the first embodiment of the present disclosure. A self-propelled vehicle system Sy shown in FIG. 1, has a self-propelled vehicle 10 running in the direction of travel as indicated by the arrow, drive lines 30, 31, 32 laid on a road surface, a start marker 35 arranged on the upstream side of the travel direction from a branching point 33 and on the right side of the drive line 30 where the drive line 30 branches into 2 drive lines 31, 32, and an end marker 36 arranged on the downstream side of the branching point 33 in the travel direction and on the right side of the drive line 31.

The drive lines 30, 31, 32 are belt-shaped with almost uniform width. Provided with the start marker 35 and the end marker 36 at a position separated by a certain distance from the center position of the drive line. In the present embodiment, for example, a size of the start marker 35 is arranged to be the same as the end marker 36. However, the start marker 35 and the end marker 36 may be of a different shape and size.

The self-propelled vehicle 10 runs in the travel direction indicated by the arrow along the drive line 30. The self-propelled vehicle 10 changes the travel direction at the branching point 33 and runs along one of the 2 drive lines 31 and 32. The travel direction that changes at this branching point 33 corresponds to the arrangement position of the start marker 35, the self-propelled vehicle 10 changes the travel direction to the right direction and runs along the drive line 31 since the start marker 35 is arranged on the right side of the drive line 30 in the travel direction of the self-propelled vehicle 10. Conversely, when the start marker 35 is placed on the left side of the drive line 30 in the travel direction of the self-propelled vehicle 10, the self-propelled vehicle 10 changes the travel direction to the left direction and runs along the drive line 32.

The right side and the left side mentioned above exemplify the first side and the second side in the "What is claimed" section, respectively. When either of the right side or left side becomes the first side, either the right side or the left side that is not the first side becomes the second side.

Completion of the change in the travel direction is indicated by the end marker 36. Since the self-propelled vehicle 10 changes the travel direction to the right direction and runs along the drive line 31, the end marker 36 is arranged on the right side of the drive line 31. Conversely, if the self-propelled vehicle 10 changes the travel direction to the left direction and runs along the drive line 32, the end marker 36 is arranged on the left side of the drive line 32.

The self-propelled vehicle 10 includes a pair of left and right drive wheels 11R, 11L, a pair of left and right driven wheels 12R, 12L, drive assemblies 13R, 13L for driving the respective drive wheels 11R, 11L by rotation, a control unit 14 for controlling the drive assemblies 13R, 13L, the drive lines 30, 31, 32, an optical detection unit 15 for detecting the start marker 35 and the end marker 36. The optical detection unit 15 includes drive line sensors 17A to 17F and marker sensors 16R, 16L.

Each of the drive assemblies 13R, 13L includes a drive motor and a gear, transmits the rotational driving force of the drive motor to the respective drive wheels 11R, 11L, and rotationally drives the drive wheels 11R, 11L. Each of the drive assemblies 13R, 13L detects the rotational speed of the respective drive wheels 11R, 11L and outputs the detection signal that indicates rotational speed of the drive wheels to the control unit 14. The drive assemblies 13R, 13L and the drive wheels 11R, 11L are examples of the drive section in the "What is claimed" section.

The control unit 14 drives and controls the drive assemblies 13R, 13L and the drive wheels 11R, 11L based on the detection outputs of the drive line sensors 17A to 17F and the marker sensors 16R, 16L. The control unit 14 controls the respective drive assemblies 13R, 13L such that the rotational speeds of the driving wheels 11R, 11L reaches the respective target values and controls the rotational speeds of the drive wheels 11R, 11L. To move the self-propelled vehicle 10 forward in a straight line, the control unit 14 controls the respective drive assemblies 13R, 13L so that the rotational speed of the drive wheels 11R, 11L are the same. To change the travel direction of the self-propelled vehicle 10 to the right direction, the control unit 14 controls the respective drive assemblies 13R, 13L so that the rotational speed of the right drive wheel 11R is lower than the rotational speed of the left drive wheel 11L. In the same way, to change the travel direction of the self-propelled vehicle 10 to the left direction, the control unit 14 controls the respective drive assemblies 13R, 13L so that the rotational speed of the left drive wheel 11L is lower than the rotational speed of the right drive wheel 11R. The difference in rotational speed can be realized by increasing the rotational speed of any one of the right driving wheel 11R or left driving wheel 11L. The rotational speed of one of the right drive wheel 11R and left drive wheel 11L may be increased and rotational speed of the other drive wheel may be decreased. A higher rotational speed difference can be more effectively generated in this case.

Six of the drive line sensors 17A to 17F are arranged in the optical detection unit 15 in a direction perpendicular to the travel direction of the self-propelled vehicle 10 and over a wider range than a width of each of the drive lines 30, 31, 32. The optical detection unit 15 has been arranged such that the center position x (center position of sensor arrangement width) of all drive line sensors from 17A to 17F almost coincides with the center position in the width direction of the self-propelled vehicle 10. Each of the drive line sensors 17A to 17F is an optical reflective sensor that detects the drive line. The number of the drive line sensors 17A to 17F is not limited to 6, and may be increased or decreased as appropriate. Position detection accuracy for the drive line increases as the number of the drive line sensor increases. The optical detection unit 15 may be positioned above the edges of the drive lines 30, 31, 32 to detect the edges. The optical detection unit 15 may be located within the line width of the drive lines 30, 31, 32.

The marker sensors 16R, 16L are provided at a position separated by a certain distance from the center position x of all the drive line sensors 17A to 17F to the left and right. This fixed distance almost coincides with the distance at which the center positions of the start marker 35 and the end marker 36 is separated from the center position of the drive line. The marker sensors 16R, 16L are also optical reflective sensors for detecting the start marker 35 and the end marker 36.

The start marker 35 can also be arranged on the drive line 30. In this case, different colors are used for the drive line 30 and the start marker 35, for example, multiple white lines are provided on the drive line 30 as the start marker 35, and a color other than white is used for the drive line 30. In this case, the drive line sensor can also function as a marker sensor. When this form is adopted, drive line sensor of the present embodiment is an example of both the drive line sensor and marker sensor in the "What is claimed" section.

The light reflectance of the drive lines 30, 31, 32 is set such that there is a significantly high difference with the light reflectance of the road surface. The level of detection output of the drive line sensors 17A to 17F is significantly different between when receiving the light reflected from the drive lines 30, 31, 32 and when receiving light reflected from the road surface. For this reason, based on the detection outputs of the drive line sensors 17A to 17F, drive line sensor from among 17A to 17F with which the drive line overlaps can be identified. That is, the drive line sensor among 17A to 17F at which the drive line is present can be identified with the direction perpendicular to the travel direction of the self-propelled vehicle 10.

Light reflectance of the start marker 35 and the end marker 36 is also set such that there is a significantly high difference with the light reflectance of the road surface. When the self-propelled vehicle 10 runs along the drive line, the marker sensors 16R, 16L pass above the start marker 35 and the end marker 36. For this reason, the start marker 35 and the end marker 36 can be detected based on the detection outputs of the marker sensors 16R, 16L.

In the self-propelled vehicle system Sy with this configuration, when the self-propelled vehicle 10 is running along the drive line 30, the control unit 14 of the self-propelled vehicle 10 controls the drive assemblies 13R, 13L based on the detection output of the drive line sensors 17A to 17F of the optical detection unit 15, and adjusts the rotational speed of the drive wheels 11 R, 11 L such that the travel direction of the self-propelled vehicle 10 is along the drive line 30. As a result, the self-propelled vehicle 10 runs without deviating from the drive line 30.

When the self-propelled vehicle 10 passes the location of the start marker 35, the control unit 14 determines that the start marker 35 has been detected based on the detection output of the marker sensor 16R. The control unit 14, on determining the detection of the start marker 35, nullifies (masks) the detection outputs of the 3 drive line sensors 17A to 17C in the left half (left-side group) of the optical detection unit 15 and the respective drive assemblies 13R, 13L are controlled based on the detection outputs of the 3 drive line sensors 17D to 17F of the right side half (right-side group) to adjust the rotational speeds of the drive wheels 11R, 11L and makes the travel direction of the self-propelled vehicle 10 follow the drive line 31. With this, the self-propelled vehicle 10 changes the travel direction to follow the drive line 31. After this, when the self-propelled vehicle 10 runs along the drive line 31 and passes the end marker 36, the control unit 14 determines that the end marker 36 is detected based on the detection output of the marker sensor 16R, and the above nullification of the detection outputs of the 3 drive line sensors 17A to 17C of the left-side group is released and the respective drive assemblies 13R, 13L is controlled based on the detection outputs of the 6 the drive line sensors 17A to 17F to adjust the rotational speeds of the drive wheels 11R, 11L and makes the travel direction of the self-propelled vehicle 10 follow the drive line 31.

In the case where the start marker 35 and the end marker 36 is arranged on the left side of the drive line 30, when the start marker 35 is detected by the marker sensor 16L, the control unit 14 nullifies the detection outputs of the 3 drive line sensors 17D to 17F in the right half (right-side group) of the optical detection unit 15 and the respective drive assemblies 13R, 13L are controlled based on the detection outputs of the 3 drive line sensors 17A to 17C of the left side half (left-side group) to adjust the rotational speeds of the drive wheels 11R, 11L and makes the travel direction of the self-propelled vehicle 10 follow the drive line 32. With this, the self-propelled vehicle 10 changes the travel direction to follow the drive line 32. After this, when the end marker 36 is detected by marker sensor 16, the control unit 14 releases the nullification of the detection outputs of the 3 drive line sensors 17D to 17F of the right group and controls the respective drive assemblies 13R, 13L based on the detection outputs of the 6 the drive line sensors 17A to 17F to adjust the rotational speeds of drive wheels 11R, 11L and makes the travel direction of the self-propelled vehicle 10 follow the drive line 32.

Figure 2:
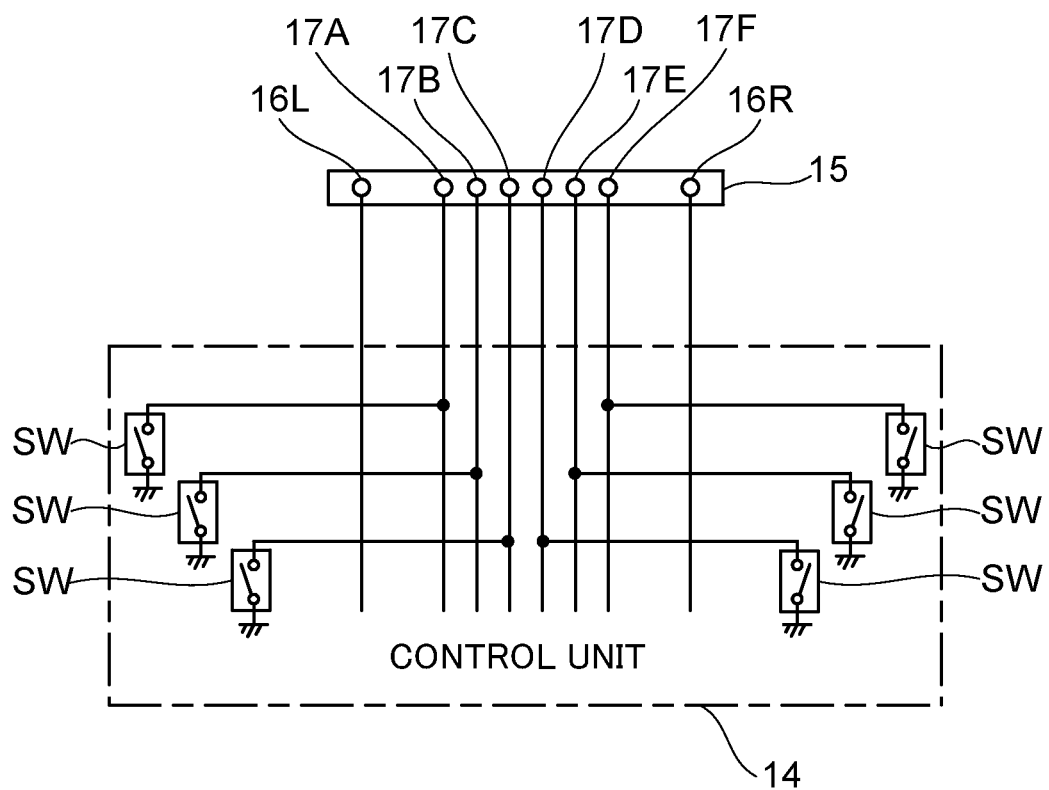
FIG. 2 is a schematic drawing showing a circuit for nullifying detection outputs of half of all drive line sensors of a self-propelled vehicle in the self-propelled vehicle system of the present embodiment.

FIG. 2 is a schematic drawing showing the circuit for nullifying the detection output of the 3 drive line sensors 17D to 17F of the right-side group or the detection output of the 3 drive line sensors 17A to 17C of the left-side group of the optical detection unit 15. Here, a switching element SW is respectively added to each line transmitting the detection output of the 3 drive line sensors 17D to 17F of the right-side group and a switching element SW is respectively added to each line transmitting the detection outputs of the 3 drive line sensors 17A to 17C of the left-side group. When the respective switching element SW in the right-side group is turned ON by the control unit 14, the detection outputs of the 3 drive line sensors 17D to 17F of the right group are forcibly set to the low level and nullified, and when the respective switching element SW in the left-side group is turned ON, the detection outputs of the 3 drive line sensors 17A to 17C of the left group are forcibly set to the low level and nullified. The same nullifying process can be implemented using software.

Next, control used when the travel direction of the self-propelled vehicle 10 is made to follow the drive line 30 and when changing the travel direction of the self-propelled vehicle 10 to follow the drive line 31 will be described in detail.

First, detection output of each of the drive line sensors 17A to 17F of the optical detection unit 15 is given a weighting that increases as the distance of each of the drive line sensors 17A to 17F increases from the center position x. Setting of the weighting is stored in the control unit 14. The weighting of the 2 drive line sensors 17C, 17D closest to the center are set to be the smallest and equal to each other, the weighting of the 2 drive line sensors 17B, 17E on both the outer sides of the drive line sensors 17C, 17D are set to be medium and equal to each other, the weighting of the outermost 2 drive line sensors 17A and 17F are set to be largest and equal to each other. The weighting to the detection output from each of the drive line sensors 17A to 17F can be implemented using either software or hardware.

Figure 3:
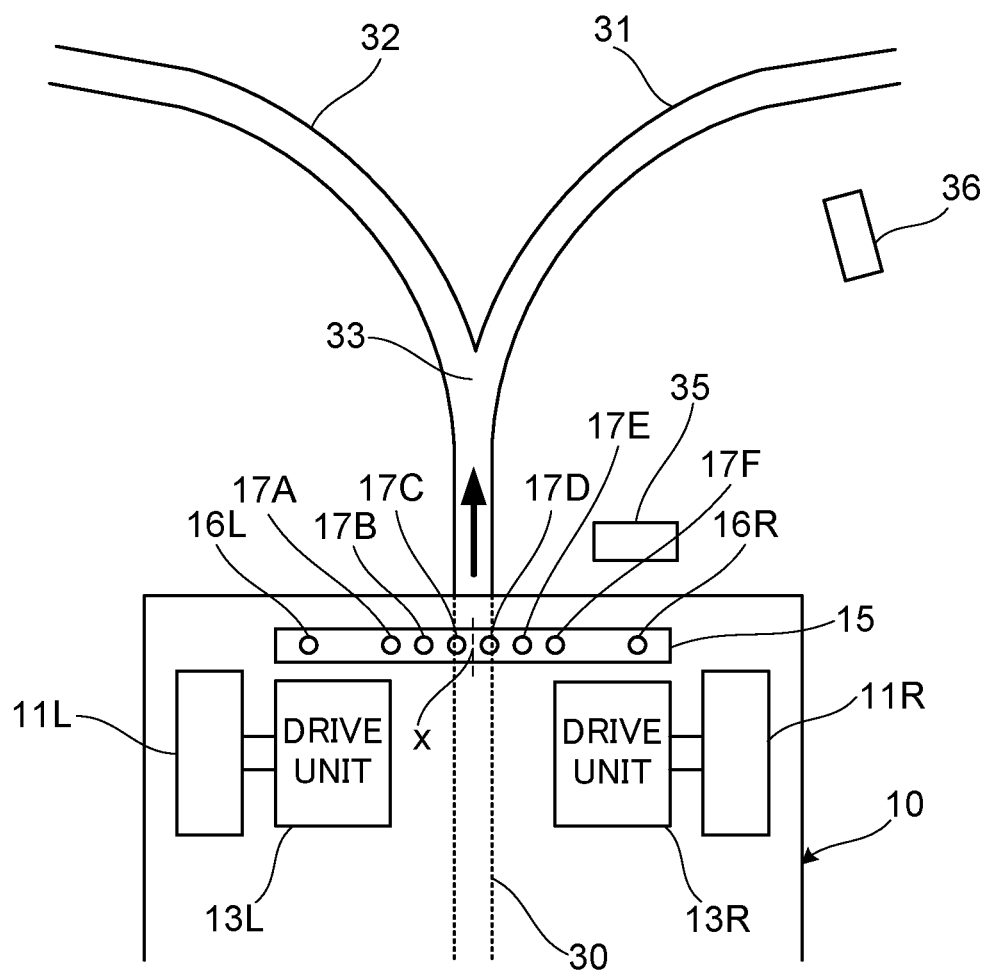
FIG. 3 is a schematic drawing showing the self-propelled vehicle running straight along the drive line.

For example, as shown in FIG. 3, when the self-propelled vehicle 10 is running along the drive line 30 and the center position x of all the drive line sensors 17A to 17F coincides or almost coincides with the center position of the drive line 30, and drive line sensor 17C from the left-side group and drive line sensor 17D from the right-side group are on the drive line 30, the drive line 30 is detected by the drive line sensors 17C, 17D. When the control unit 14 receives the detection output from the drive line sensor 17C of the left-side group and the drive line sensor 17D of the right-side group at the same time, a small weighting is added to the detection outputs, since each of the detection outputs to which weighting is added is equal, and the rotational speed of each of the drive wheels 11R, 11L is synchronized by controlling each drive assemblies 13R, 13L. For this reason, the self-propelled vehicle 10 moves forward in a straight line.

Figure 4:
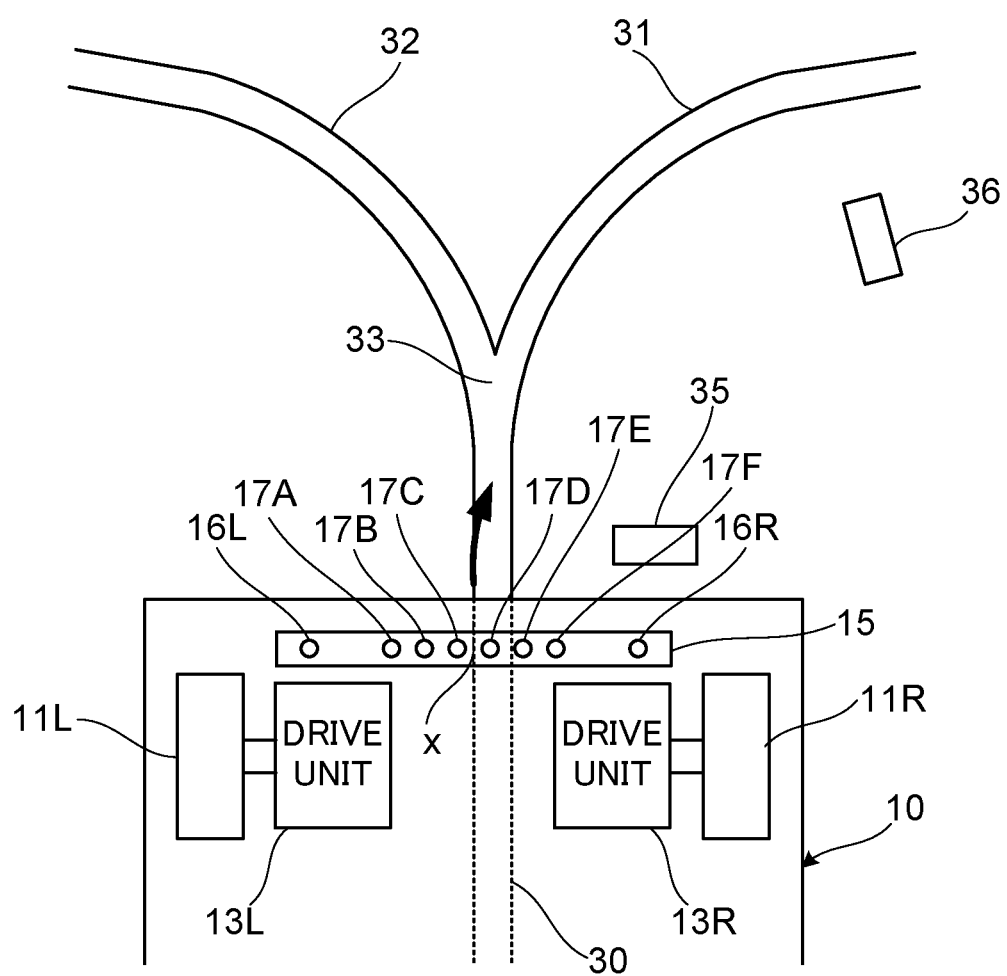
FIG. 4 is a schematic drawing showing a travel direction of the self-propelled vehicle when the self-propelled vehicle slightly shifts towards a left side from the drive line.

As shown in FIG. 4, when the center position x of all the drive line sensors 17A to 17F deviates slightly to the left from the center position of the drive line 30 and only the drive line sensor 17D from the right-side group is on the drive line 30, the drive line 30 is detected by only the drive line sensor 17D. When the control unit 14 receives the detection output from only drive line sensor 17D of the right-side group, a small weighting is added to the detection output, since the detection output to which the weighting added is small, each of the drive assemblies 13R, 13L is controlled and the rotational speed of the right-side drive wheel 11R is set slightly lower than the rotational speed of the left-side drive wheel 11L by an amount that is proportional to the weighting. With this, the travel direction of the self-propelled vehicle 10 is slightly changed to the right and the center position x of all the drive line sensors 17A to 17F is moved closer to the center position of the drive line 30.

Figure 5:
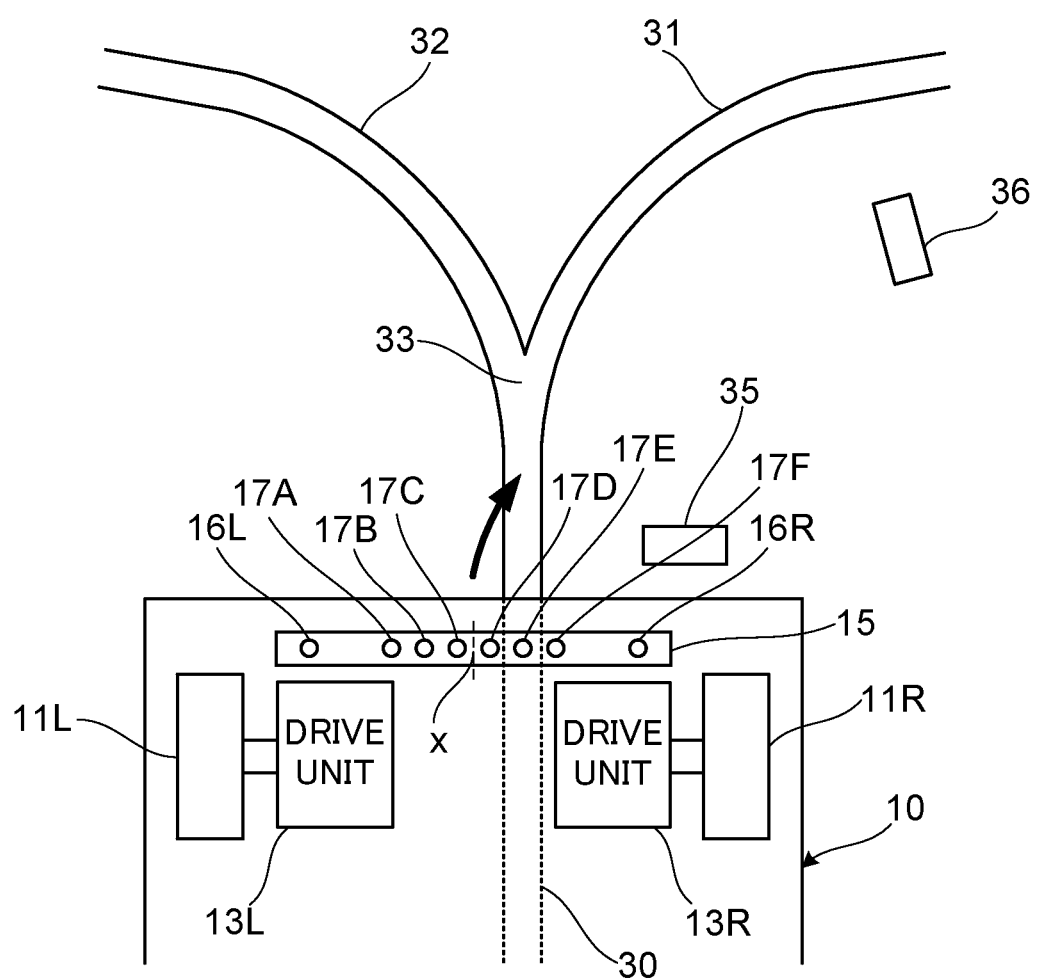
FIG. 5 is a schematic drawing showing the travel direction of the self-propelled vehicle when the self-propelled vehicle shifts further towards the left side from the drive line.

As shown in FIG. 5, when the center position x of all the drive line sensors 17A to 17F deviates further to the left from the center position of the drive line 30 and only the drive line sensor 17E from the right-side group is on the drive line 30, the drive line 30 is detected by only the drive line sensor 17E. When the control unit 14 receives the detection output from the drive line sensor 17E of the right-side group, a moderate weighting is added to the detection output, since the detection output to which weighting added is moderate, each of the drive assemblies 13R, 13L is controlled and the rotational speed of the right-side drive wheel 11R is set further lower than the rotational speed of left-side drive wheel 11L by an amount that is proportional to the weighting. With this, the travel direction of the self-propelled vehicle 10 is further changed to the right and the center position x of all the drive line sensors 17A to 17F is moved closer to the center position of the drive line 30.

Figure 6:
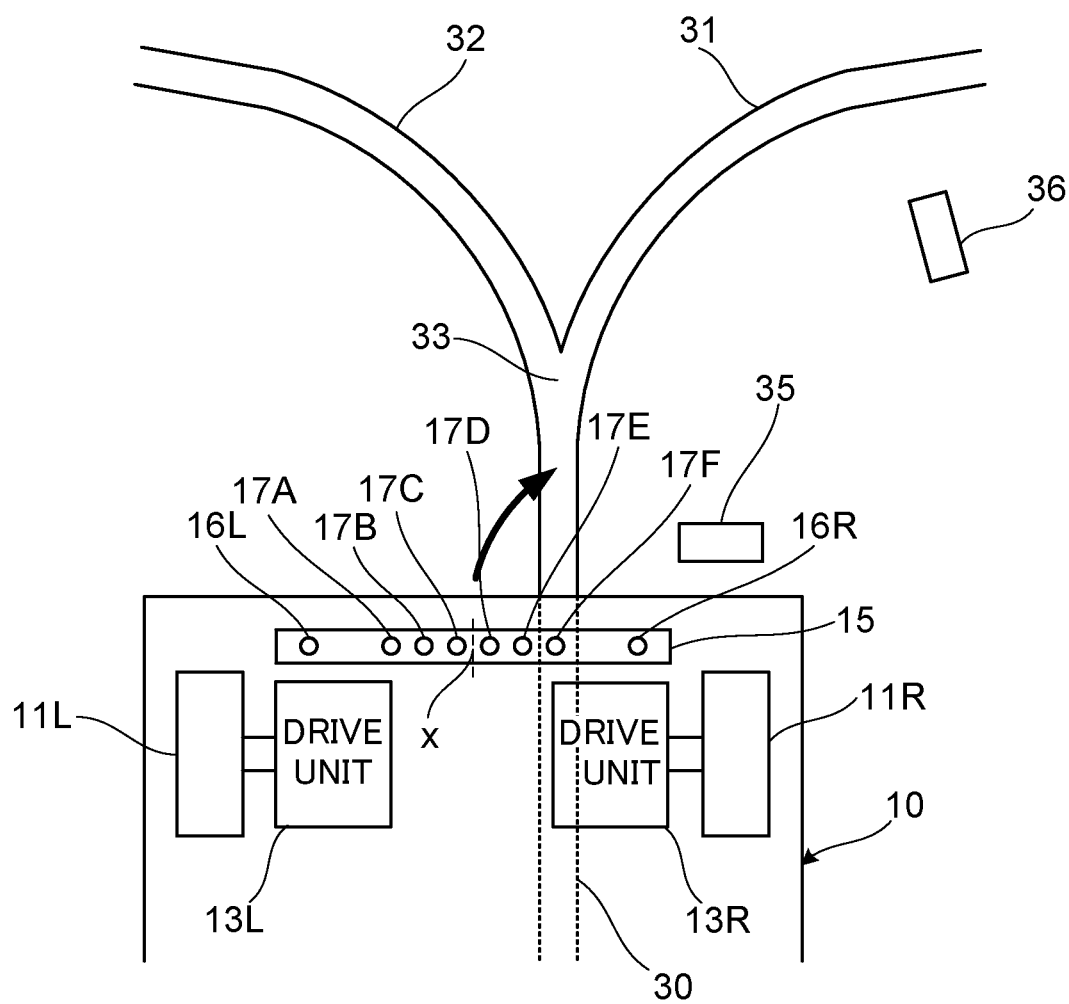
FIG. 6 is a schematic drawing showing the travel direction of the self-propelled vehicle when the self-propelled vehicle shifts significantly towards the left side from the drive line.

As shown in FIG. 6, when the center position x of all the drive line sensors 17A to 17F deviates significantly to the left from the center position of the drive line 30 and only drive line sensor 17F from the right-side group is on the drive line 30, the drive line 30 is detected by only the drive line sensor 17F. When the control unit 14 receives the detection output from the drive line sensor 17F of the right-side group, a maximum weighting is added to the detection output, since the detection output to which weighting added is the maximum, each of the drive assemblies 13R, 13L is controlled and the rotational speed of the right-side drive wheel 11R is set sufficiently lower than the rotational speed of left-side drive wheel 11L by an amount that is proportional to the weighting. With this, the travel direction of the self-propelled vehicle 10 is changed significantly to the right and the center position x of all the drive line sensors 17A to 17F is moved closer to the center position of the drive line 30.

Even when the center position x of all the drive line sensors 17A to 17F has deviated to the right from the center position of the drive line 30, the control unit 14 controls and drives the drive assemblies 13R, 13L, and sets the rotational speed of the left-side drive wheel 11L slower than the rotational speed of the right-side drive wheel 11R such that more the deviation of the center position x to the right from the center position of the drive line 30, based on the detection output from each of the drive line sensors 17A, 17B, 17C of the left-side group, and the respective weighting is added to each of them, the travel direction of the self-propelled vehicle 10 is changed to the left direction and the center position x of all the drive line sensors 17A to 17F is moved closer to the center position of the drive line 30.

In addition, when the drive line 30 is detected simultaneously by 2 adjacent drive line sensors from the same group, such as the drive line sensors 17D, 17E or drive line sensors 17E, 17F of the right-side group and drive line sensors 17C, 17B or drive line sensors 17B, 17A of the left-side group, the control unit 14, for example, adds the respective weighting to each of the detection outputs from the 2 drive line sensors and based on the average value of each of the detection outputs to which weighting has been added, sets a rotational speed difference between the drive wheels 11R, 11L, and adjusts the extent to which the travel direction of the self-propelled vehicle 10 is changed.

When the self-propelled vehicle 10 is moving along the drive line 30, the control unit 14 controls and drives drive assemblies 13R, 13L based on the detection output from each of the drive line sensors 17A to 17F of the optical detection unit 15, such that, more the deviation of the center position x of all the drive line sensors 17A to 17F to the left from the center position of the drive line 30, the travel direction of the self-propelled vehicle 10 is changed increasingly to the right and more the deviation of the center position x of all the drive line sensors 17A to 17F to the right from the center position of the drive line 30, the travel direction of the self-propelled vehicle 10 is changed increasingly to the left. As a result, the travel direction of the self-propelled vehicle 10 follows the drive line 30 and the self-propelled vehicle 10 runs without deviating from the drive line 30.

Figure 7:
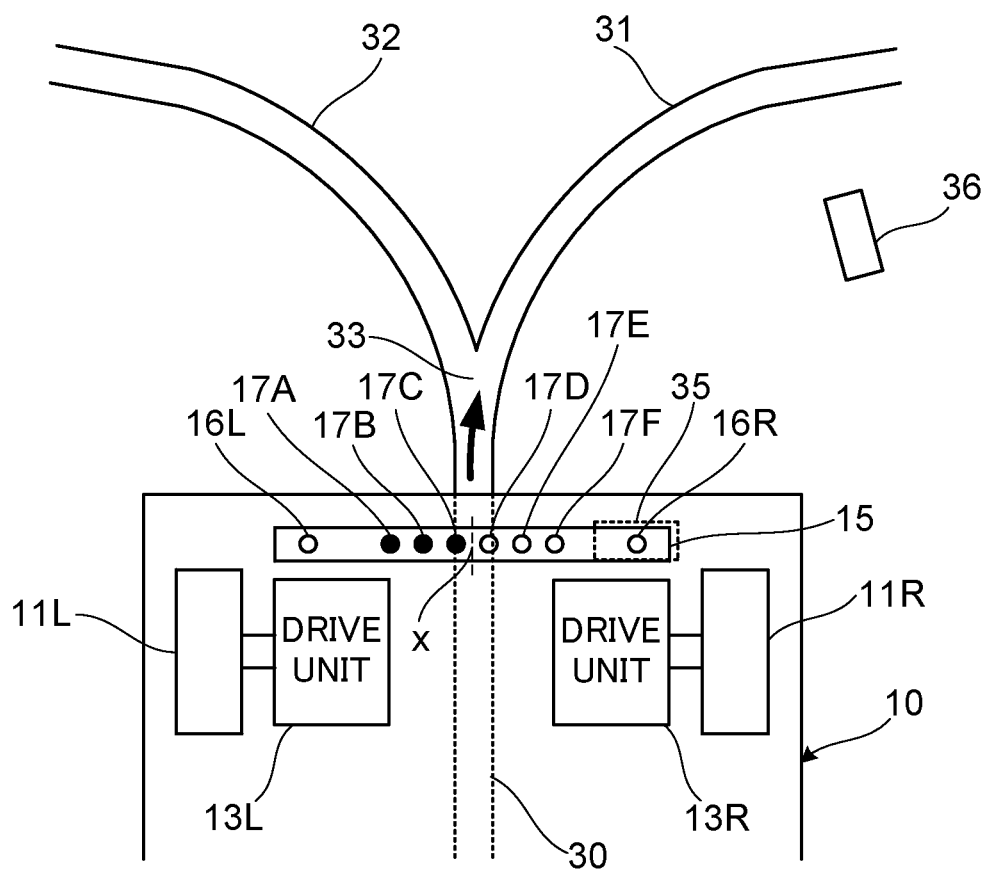
FIG. 7 is a schematic drawing showing a state when the detection output of a left half of all drive line sensors of the self-propelled vehicle has been nullified.

As shown in FIG. 7, when the self-propelled vehicle 10 passes the location of the start marker 35, the control unit 14 determines that the start marker 35 has been detected based on the detection output of marker sensor 16R. The control unit 14, on determining the detection of the start marker 35, nullifies the detection outputs of the 3 drive line sensors 17A to 17C in the left-side group of the optical detection unit 15 and the respective drive assemblies 13R, 13L are controlled based on the detection outputs of the 3 drive line sensors 17D to 17F of the right-side group to adjust the rotational speeds of drive wheels 11R, 11L. With this, the travel direction of the self-propelled vehicle 10 is changed to the right direction.

Figure 8:
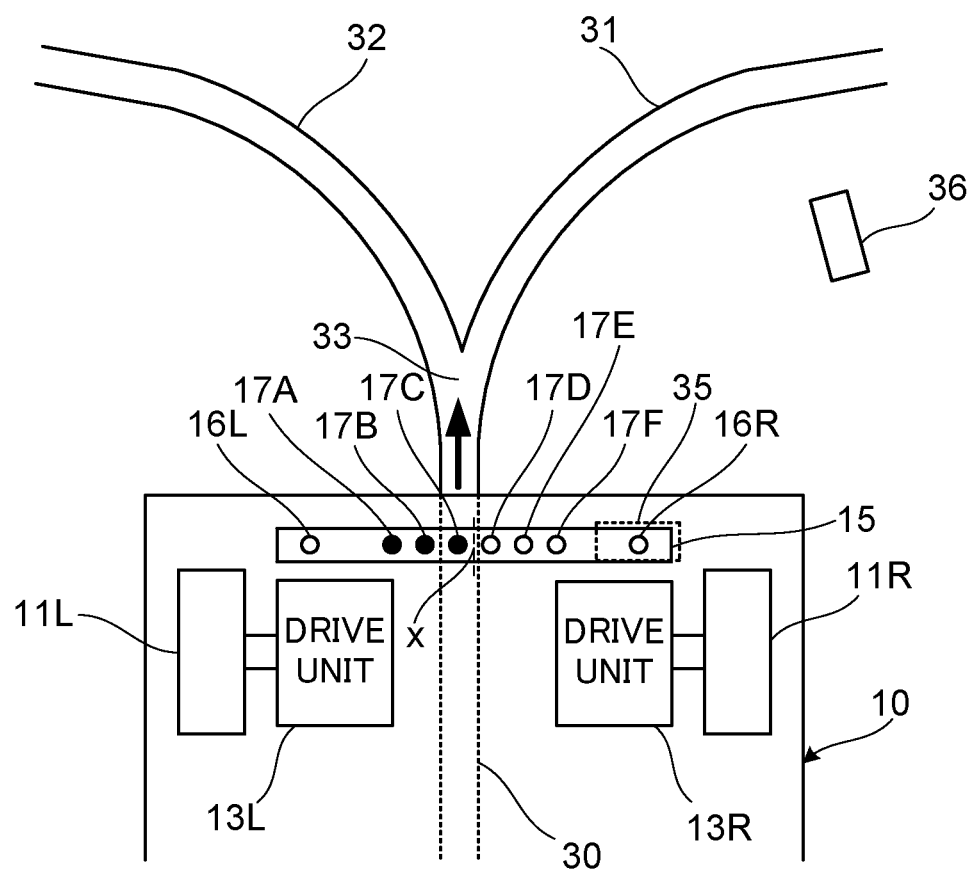
FIG. 8 is a schematic drawing showing the travel direction of the self-propelled vehicle when slightly shifted towards a right side from the drive line after the detection output of the left half of all drive line sensors have been nullified.

For example, as shown in FIG. 8, even if the center position x of all the drive line sensors 17A to 17F deviates slightly to the right from the center position of the drive line 30 and only the drive line sensor 17C of the left-side group is on the drive line 30, since the detection output from the drive line sensor 17C of the left-side group is nullified, the control unit 14 does not change the travel direction of the self-propelled vehicle 10 to the left direction based on only the detection output from the drive line sensor 17C of the left-side group.

Figure 9:
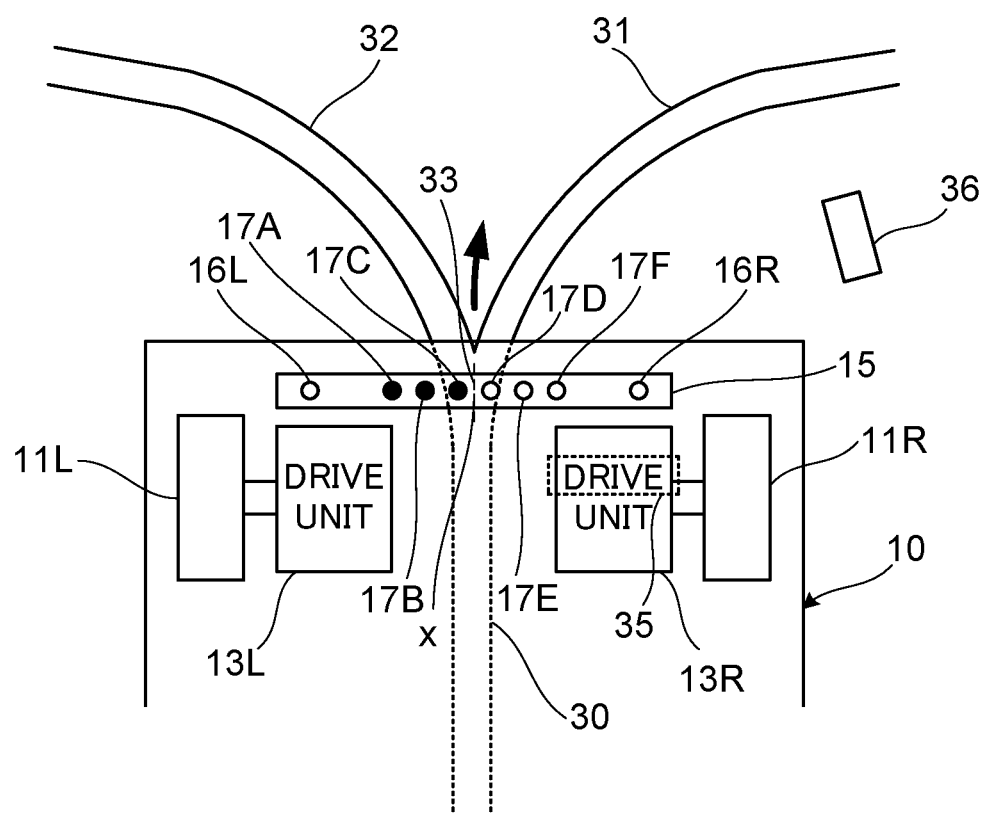
FIG. 9 is a schematic drawing showing the travel direction of the self-propelled vehicle when the self-propelled vehicle passes through the branching point of the drive line after the detection output of the left half of all drive line sensors have been nullified.

As shown in FIG. 9, in the state where the self-propelled vehicle 10 runs up to branching point 33 and the 2 drive line sensors 17C, 17D at the middle are on branching point 33, the control unit 14 adds a small weighting only to the detection output from the drive line sensor 17D of the right-side group, though the drive line 30 is detected by both the drive line sensors 17C, 17D since the detection output from the drive line sensor 17C of the left-side group is nullified, and because the detection output to which the weighting is added is small, the drive assemblies 13R, 13L are controlled and the rotational speed of the right-side drive wheel 11R is set slightly slower than the rotational speed of left-side drive wheel 11L by an amount corresponding to the weighting. With this, there is a small change in the travel direction of the self-propelled vehicle 10 to the right.

Figure 10:
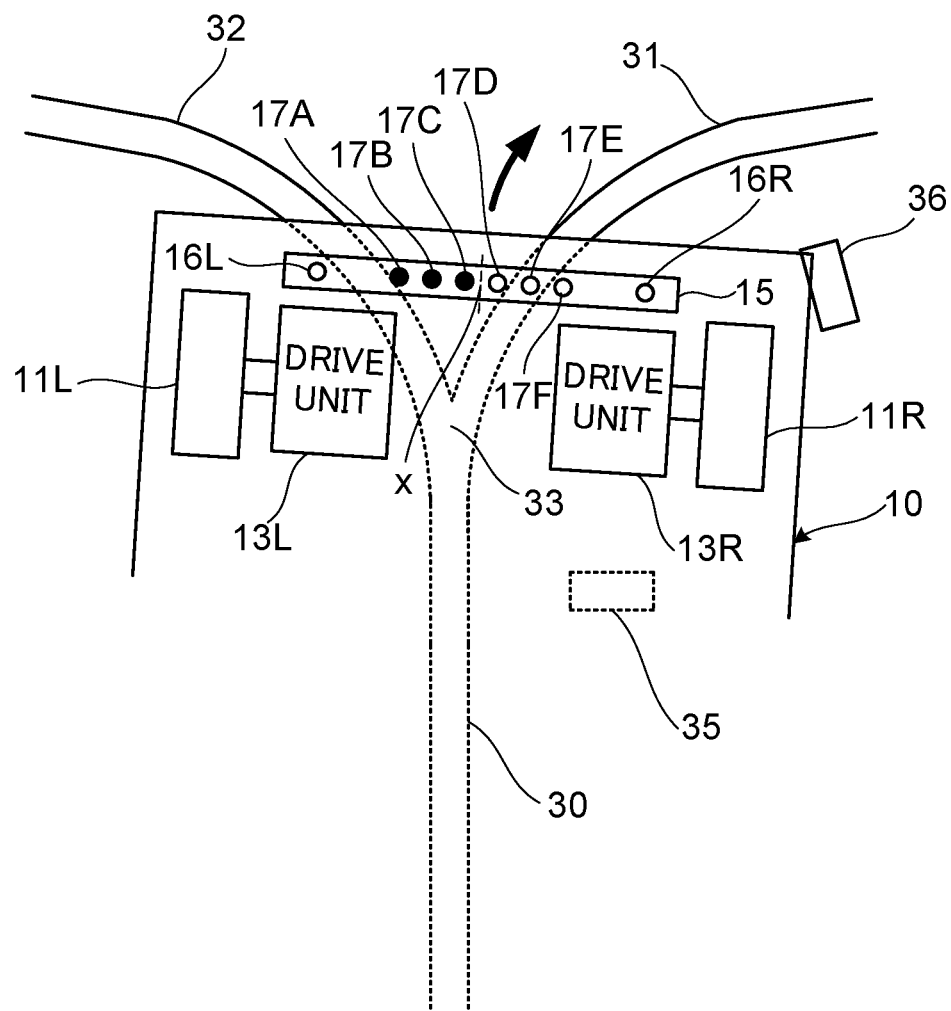
FIG. 10 is a schematic drawing showing a state of the self-propelled vehicle when the travel direction starts to change from the branching point towards the right after the detection output of the left half of all drive line sensors have been nullified.

Subsequently, as shown in FIG. 10, in the state where the self-propelled vehicle 10 passes the branching point 33 and the drive line sensor 17E of the right-side group is on the drive line 31, since the drive line 31 is detected by the drive line sensor 17E of the right-side group, the control unit 14 adds a moderate weighting to the detection output from the drive line sensor 17E of the right-side group, since the detection output to which the weighting is added is moderate, the drive assemblies 13R, 13L are controlled and the rotational speed of the right-side drive wheel 11R is set further slower than the rotational speed of the left-side drive wheel 11L by an amount corresponding to the weighting. With this, the travel direction of the self-propelled vehicle 10 is further changed to the right.

Figure 11:
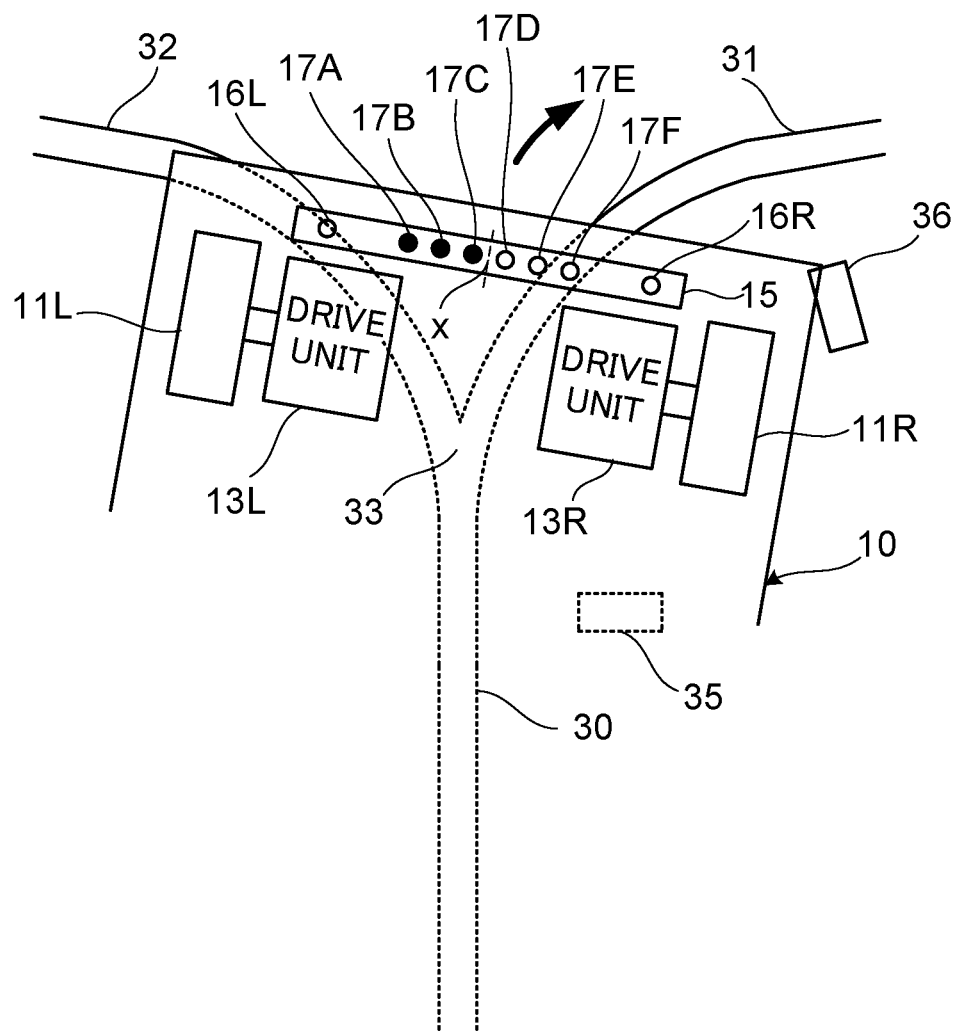
FIG. 11 is a schematic drawing showing a state of the self-propelled vehicle when the travel direction further changes from the branching point towards the right after the detection output of the left half of all drive line sensors have been nullified.

In addition, as shown in FIG. 11, in the state where the self-propelled vehicle 10 continues to turn right along the drive line 31 and the drive line sensor 17F of the right-side group is on the drive line 31, since the drive line 31 is detected by the drive line sensor 17F of the right-side group, the control unit 14 adds a maximum weighting to the detection output from drive line sensor 17F of the right-side group, because the detection output to which weighting is added is maximum, the drive assemblies 13R, 13L are controlled and the rotational speed of the right-side drive wheel 11R is set sufficiently slower than the rotational speed of the left-side drive wheel 11L by an amount corresponding to the weighting. With this, the travel direction of the self-propelled vehicle 10 changes significantly to the right.

In addition, when the drive line 31 is detected simultaneously by the 2 drive line sensors 17D, 17E or the 2 drive line sensors 17E, 17F of the right-side group, for example, adds the respective weighting to each of the detection outputs from the 2 drive line sensors and based on the average of each of the detection outputs to which weighting has been added, sets a rotational speed difference between the drive wheels 11R, 11L, and adjusts the extent to which the travel direction of the self-propelled vehicle 10 is changed to the right direction.

As a result, the self-propelled vehicle 10 runs from the drive line 30 to the drive line 31 after passing the branching point 33, and the travel direction is changed smoothly to the right along the drive line 31. Also, even if the self-propelled vehicle 10 deviates and all the drive line sensors 17A to 17C of the left-side group shift on to the drive line 31 on the left side, the travel direction of the self-propelled vehicle 10 changes with stability to the right direction without being changed to the left direction, since the detection output from the drive line sensors 17A to 17C is nullified.

Figure 12:
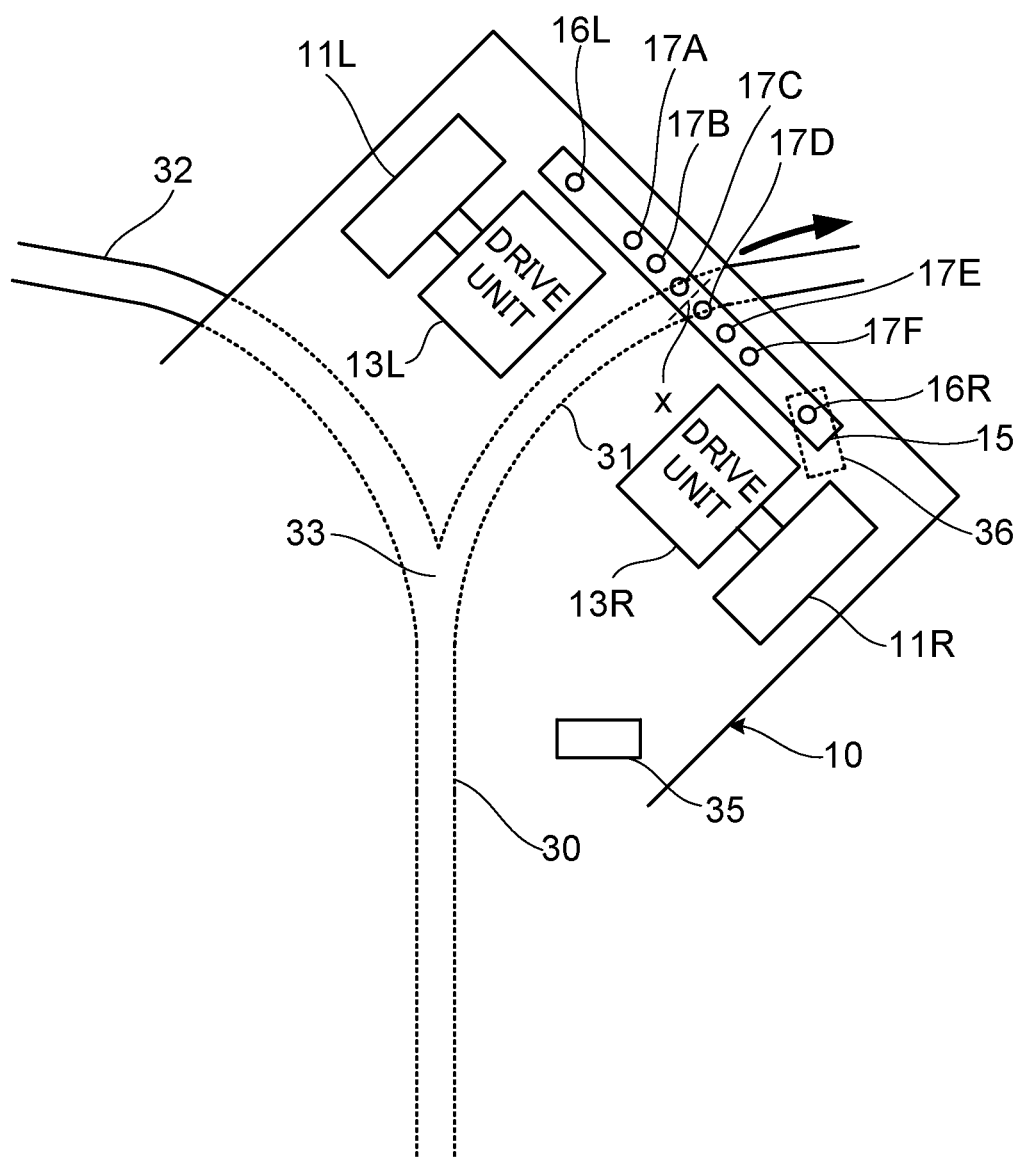
FIG. 12 is a schematic drawing showing the travel direction of the self-propelled vehicle along the drive line of the right side with nullification of the detection outputs of the left half of all drive line sensors released.

Thereafter, as shown in FIG. 12, when the self-propelled vehicle 10 passes the location of the end marker 36, the control unit 14 determines that the end marker 36 is detected based on the detection output of the marker sensor 16R. The control unit 14 on determining the detection of the end marker 36, releases the nullification of the detection outputs of the drive line sensors 17A to 17C of the left-side group, and resumes control of the travel direction of the self-propelled vehicle 10 based on the detection outputs of the 6 drive line sensors 17D to 17F of the optical detection unit 15. As a result, travel direction of the self-propelled vehicle 10 follows the drive line 31 and the self-propelled vehicle 10 runs without deviating from the drive line 31.

When the start marker 35 is arranged on the upstream side of the travel direction from the branching point 33 and on the right side of the drive line 30, and the end marker 36 is positioned on the downstream side of the travel direction from branching point 33 and on the left side of the drive line 32, since the start marker 35 is detected by marker sensor 16L, the control unit 14 determines the detection of the start marker 35 based on the detection output from marker sensor 16L and nullifies the detection output from the 3 drive line sensors 17D to 17F of the right-side group of optical detection unit 15, and controls the drive assemblies 13R, 13L based on the detection output from the 3 drive line sensors 17A to 17C of the left-side group to adjust the rotational speed of drive wheels 11R, 11L and change the travel direction of the self-propelled vehicle 10 to the left direction. When the end marker 36 is detected by marker sensor 16L, the control unit 14 determines the detection of the end marker 36 based on the detection output from marker sensor 16L and releases the nullification of the detection output from the 3 drive line sensors 17D to 17F of the right-side group, makes the self-propelled vehicle 10 run along the drive line 32 based on the detection output from the 6 the drive line sensors 17A to 17F of the optical detection unit 15.

In the present embodiment, since the control unit 14 nullifies detection output from the drive line sensors 17A to 17C of the left-side group or detection output from the drive line sensors 17D to 17F of the right-side group as the self-propelled vehicle 10 passes the branching point 33 of the drive line and controls the travel direction of the self-propelled vehicle 10 based on the detection output from the drive line sensors of the group that is not nullified, this enables smooth change in the travel direction of the self-propelled vehicle 10 and even if the self-propelled vehicle 10 deviates, change in the travel direction of the self-propelled vehicle 10 is carried out with stability.

Incidentally, in the technology described in the background art, since half the detection elements are positioned on the guide path tape and made to coincide with either the left or right edge of the guide path tape by offsetting the center of each detection element, when the vehicle sways to the left or right, half the detection elements detect the guide path tape that branches off in a different direction from the travel direction. Smooth change in the travel direction of the vehicle was sometimes impaired for this reason. The likelihood of occurrence of such a problem was also attributed to the fact that the guide path tape is narrower or wider than the appropriate size.

Compared with the above, in the present embodiment, even if the drive line branches into 2 directions, travel direction of the self-propelled vehicle can be changed with stability and smoothly to any one of the 2 directions.

Incidentally, in the embodiment described above, when the start marker 35 is detected, the control unit 14 nullifies all the drive line sensors of either the left-side group or right-side group, and thereafter, when the end marker 36 is detected, the nullification of the detection outputs of all the drive line sensors is released, but instead of this, the control unit 14 can measure the elapsed time from the when the start marker 35 is detected, for example, by using a built-in timer, and the nullification of the detection outputs of all the drive line sensors can be released when the elapsed time reaches a specified time that has been set in advance.

In addition, when the travel direction of the self-propelled vehicle 10 is changed to follow the drive line of one side after the start marker 35 is detected by one of the marker sensors 16R, 16L, if the other drive line is detected by the other marker sensor 16R, 16L, the control unit 14 can release the nullification of the detection outputs of all drive line sensors. For example, after the start marker 35 is detected by the marker sensor 16R, when the travel direction of the self-propelled vehicle 10 has been changed to follow the drive line 31 as shown in FIG. 11, if the drive line 32 is detected by the marker sensor 16L, the control unit 14 releases the nullification of the detection outputs of the drive line sensors 17A to 17C. Since the drive line 32 is not detected by the drive line sensors 17A to 17C when the drive line 32 is detected by marker sensor 16, travel direction of the self-propelled vehicle 10 will not become unstable.

The drive line sensors 17A to 17F of the optical detection unit 15 is divided into drive line sensors 17A to 17C of the left-side group and drive line sensors 17D to 17F of the right-side group, the left and right-side groups can also be set by excluding the center drive line sensors of all the drive line sensors 17A to 17F. For example, the left-side group can be set to the drive line sensors 17A, 17B and right-side group can be set to 17E, 17F by excluding the 2 drive line sensors 17C and 17D at the center.

The travel direction of the self-propelled vehicle 10 is being changed by controlling the drive assemblies 13R, 13L, and adjusting the rotational speed of each drive wheel 11R, 11L, the travel direction of the self-propelled vehicle 10 can be changed by providing a steering wheel on the self-propelled vehicle 10 and changing the direction of the steering wheel.

The drive wheels 11R, 11L, or the drive wheels 11R, 11L and the driven wheels 12R, 12L can be replaced by a pair of left and right caterpillars.

In the embodiment described above, the optical detection unit 15 has been provided in the vicinity of the drive wheels 11R, 11L and the drive assemblies 13R, 13L, but since the travel direction of the self-propelled vehicle 10 is changed by the drive wheels 11R, 11L and the drive assemblies 13R, 13L, if the optical detection unit 15 is provided in the vicinity of the drive wheels 11R, 11L and the drive assemblies 13R, 13L, there will be no delay in changing the travel direction of the self-propelled vehicle 10 and detection will also be accurate. The arrangement position of the optical detection unit 15 is not limited to the vicinity of the drive wheels 11R, 11L and the drive assemblies 13R, 13L.

For example, (i) the optical detection unit 15 may be provided on a drive unit consisting of the drive wheels 11R, 11L and the drive assemblies 13R, 13L. In this case, steering control can be simplified since the optical detection unit 15 performs the same movements as the left and right movement of the drive unit that is used for steering. (ii) The optical detection unit 15 can be integrally formed with the drive unit, and the optical detection unit 15 may be arranged at a position that is at the front position of the travel direction in the self-propelled vehicle 10 and away from the drive unit. In this case, slight sways of the drive unit to the left and the right is magnified and detected by the optical detection unit 15. As a result, travel control of the self-propelled vehicle 10 with higher accuracy becomes possible. In the case where the optical detection unit 15 is provided on the body frame of the self-propelled vehicle 10 instead of the drive unit, for example, even if the optical detection unit 15 is provided in the front position described above, there will be a delay in the detection of sways to the left and right by the optical detection unit 15 from the actual timing of occurrence in the self-propelled vehicle 10, but if the configuration of (i) or (ii) described above is used, travel control of the self-propelled vehicle 10 becomes possible with high accuracy by responding promptly to the actual shaking of the self-propelled vehicle 10 since the optical detection unit 15 detects the left and right sways at a timing close to the actual timing of occurrence in the self-propelled vehicle 10.

Figure 13:
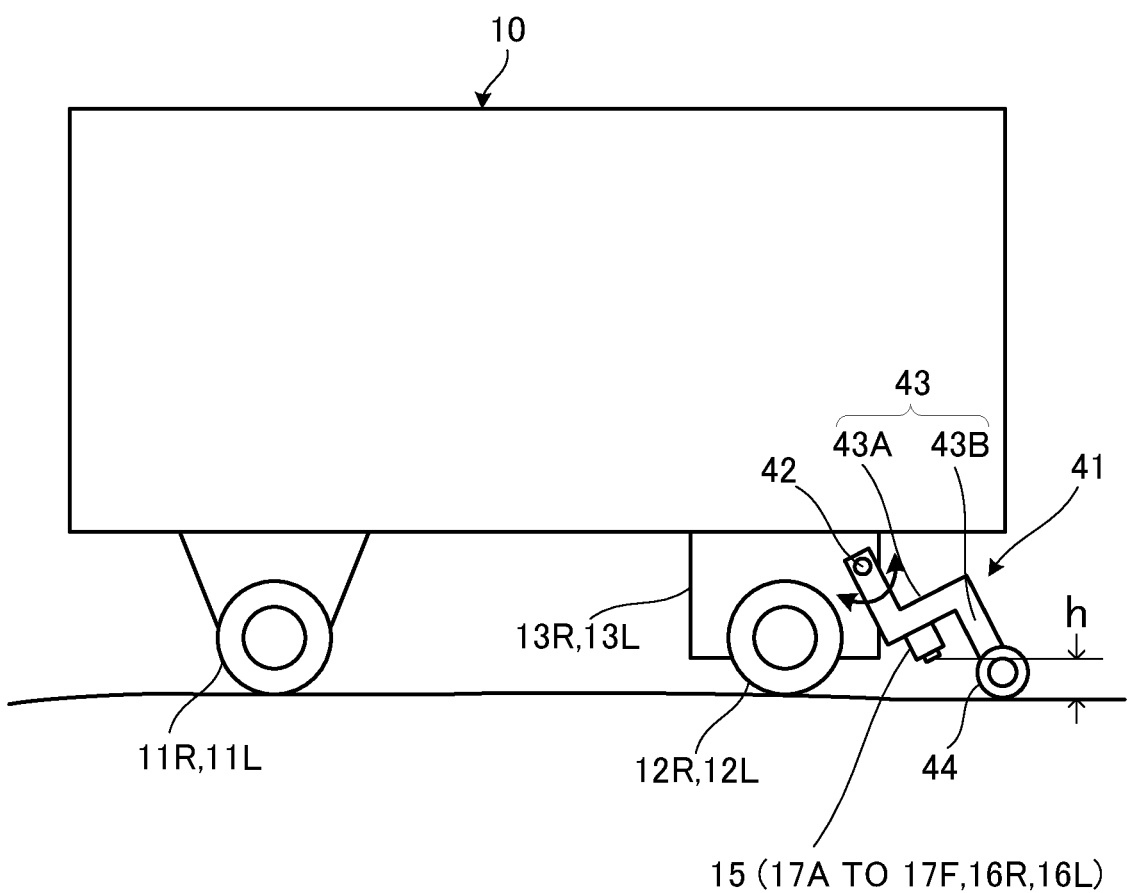
FIG. 13 is a drawing showing one example for a support mechanism of an optical detection unit in the self-propelled vehicle.

In addition, as shown in FIG. 13, the optical detection unit 15 can be supported by a support device 41 such that the optical detection unit is allowed to swing, and separation distance h between the drive line sensors 17A to 17F and the drive line, and separation distance h between the marker sensors 16R, 16L and the marker may be maintained constant. The support device 41 includes a support shaft 42 that is in the horizontal direction and perpendicular to the travel direction provided in a housing of each of the drive assemblies 13R, 13L, a swing frame 43 that is supported by the support shaft 42 and is free to rotate, and a pair of left and right small wheels 44 attached to the lower end of swing frame 43. Swing frame 43 consists of a L-shaped arm unit 43A, and legs 43B connected to the bottom end of the L-shaped arm unit 43A extending downward, a support shaft 42 that can rotate passes through at the upper end portion of the L-shaped arm unit 43A, the optical detection unit 15 is fixed to the bottom portion of the L-shaped arm unit 43A, and a pair of small wheels 44 are attached to the lower end of legs 43B.

Since the swing frame 43 is free to rotate with the support shaft 42 as the center, the swing frame 43 is biased in the clockwise direction by its own weight, weight of the optical detection unit 15, and weight of the pair of small wheels 44 such that the state in which the pair of small wheels 44 are in contact with the road surface is maintained. For this reason, the pair of small wheels 44 always rolls in contact with the road surface even if the road surface is flat or undulating up and down. The optical detection unit 15 is always maintained at a constant height (separation distance h) from the road surface by the pair of small wheels 44. Even if the road surface is flat or undulating up and down, separation distance h between the drive line sensors 17A to 17F of the optical detection unit 15 and drive line, and separation distance h between the marker sensors 16R, 16L and marker is maintained constant. As a result, detection of the drive line by the drive line sensors 17A to 17F and detection of the marker by the marker sensors 16R, 16L can be performed with stability.

If the separation distance between the drive line sensors 17A to 17F and drive line fluctuates due to undulations on the road surface, the amount of light reflected received by the drive line sensors 17A to 17F from the drive line will fluctuate, since the amount of light reflected will be close to the amount of light reflected from the road surface or all the light reflected will be at the same color level as the color of the drive line 30, this may cause errors in detecting the drive line.

On the other hand, in the case where the separation distance between the drive line sensors 17A to 17F and drive line is maintained constant irrespective of undulations on the road surface, the received amount of light reflected by the drive line sensors 17A to 17F from the drive line does not fluctuate and erroneous detection of drive line will not occur.

For the same reason, wrong detection of markers by the marker sensors 16R, 16L will not take place.

Figure 14:
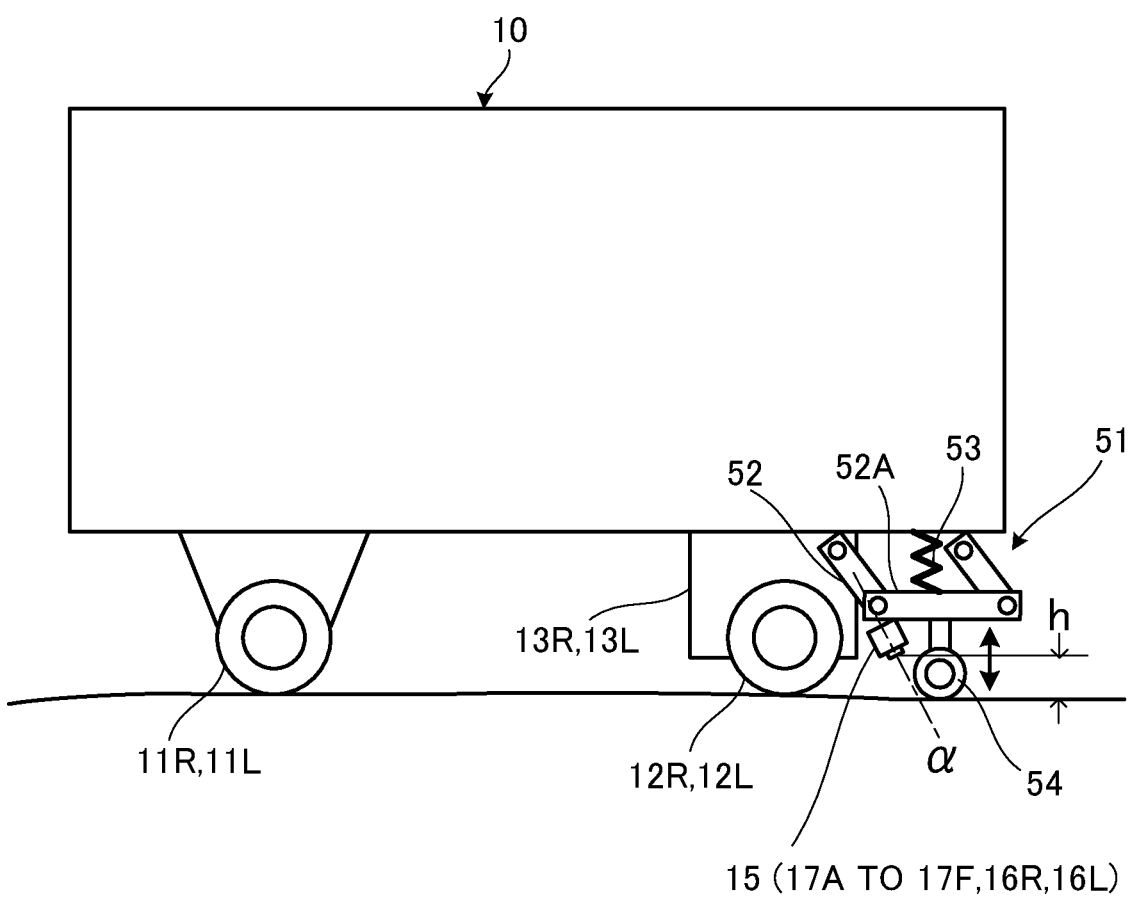
FIG. 14 is a drawing showing a second example for the support mechanism of the optical detection unit in the self-propelled vehicle.

In addition, the optical detection unit 15 may be supported by a support device 51 as shown in FIG. 14. The support device 51 includes a parallelogram link 52, a spring 53 to a bias link member 52A on the lower side of the parallelogram link 52 downwards, and a pair of left and right small wheels 54 provided at the bottom of a link member 52A. The link member 52A is supported such that the link can be moved in parallel along the up down direction by the parallelogram link 52, and the optical detection unit 15 is fixed to this link member 52A.

Here, the spring 53 biases the link member 52A and the pair of small wheels 54 downward such that the pair of small wheels 54 are in contact with the road surface. For this reason, the pair of small wheels 54 always rolls in contact with the road surface even if the road surface is flat or undulating up and down. The link member 52A is maintained at a constant height from the road surface by the pair of small wheels 44, and moves in parallel along the up down direction together with the pair of small wheels 44. Accordingly, the optical detection unit 15 is also maintained at a constant height (separation distance h) from the road surface and moves in parallel along the up down direction. By maintaining the optical detection unit 15 at a constant height (separation distance h), the separation distance h between the drive line sensors 17A to 17F of the optical detection unit 15 and drive line, and the separation distance h between the marker sensors 16R, 16L and marker is maintained constant. In addition, as the optical detection unit 15 moves in parallel along the up down direction, an incident direction a of the light reflected from the drive line to the drive line sensors 17A to 17F and the incident direction a of the light reflected from the marker to the marker sensors 16R, 16L is maintained a constant. For this reason, detection of the drive line by the drive line sensors 17A to 17F and detection of the marker by the marker sensors 16R, 16L can be performed with stability.

If the incident direction of the light reflected from the drive line to the drive line sensors 17A to 17F fluctuates due to undulations on the road surface, the amount of reflected light received by the drive line sensors 17A to 17F from the drive line will fluctuate, this may cause errors in detecting the drive line.

On the other hand, if the incident direction a of the light reflected from the drive line to the drive line sensors 17A to 17F is maintained constant irrespective of the undulations on the road surface, the amount of reflected light received by the drive line sensors 17A to 17F will not fluctuate. For this reason, if the separation distance between the drive line sensors 17A to 17F and drive line is maintained constant, and the incident direction a of the light reflected received by the drive line sensors 17A to 17F from the drive line is maintained constant, erroneous detection of the drive line is less likely to occur.

For the same reason, wrong detection of markers by the marker sensors 16R, 16L is less likely to occur.

Further, when support device 41 shown in FIG. 13 or support device 51 shown in FIG. 14 is applied, the drive line sensors 17A to 17F can be prevented from coming in contact with the road surface or drive line, while maintaining the drive line sensors 17A to 17F sufficiently close to the road surface or drive line and the detection accuracy for the drive line position by the drive line sensors 17A to 17F can be improved. For this reason, even to detect magnetic drive lines that are inferior in position detection accuracy as compared to the detection of the optical drive line, application of support device 41 or the support device 51 is effective in the sense that position detection accuracy that is sufficient for practical use is possible. To detect magnetic drive lines, for example, a magnetic tape is stuck on the road surface as the drive line, multiple Hall elements each detecting the magnetic tape are arranged in the direction intersecting the magnetic tape and are attached to the self-propelled vehicle, on what positions that the magnetic tapes overlap the Hall elements are determined based on the detection output of each of the Hall elements, and the travel direction of the self-propelled vehicle is controlled so as to follow the magnetic tape in accordance to this position. In this case, by supporting each hall element with support device 41 shown in FIG. 13 or support device 51 shown in FIG. 14, Hall elements can be prevented from coming in contact with the road surface or drive line, while maintaining the Hall elements sufficiently close to the road surface or drive line, and the detection accuracy for the drive line position by the Hall elements can be improved by supplementation. Accordingly, drive line and drive line sensor of the present disclosure includes a magnetic tape and the Hall elements for detecting the magnetic tape.

Figure 15:
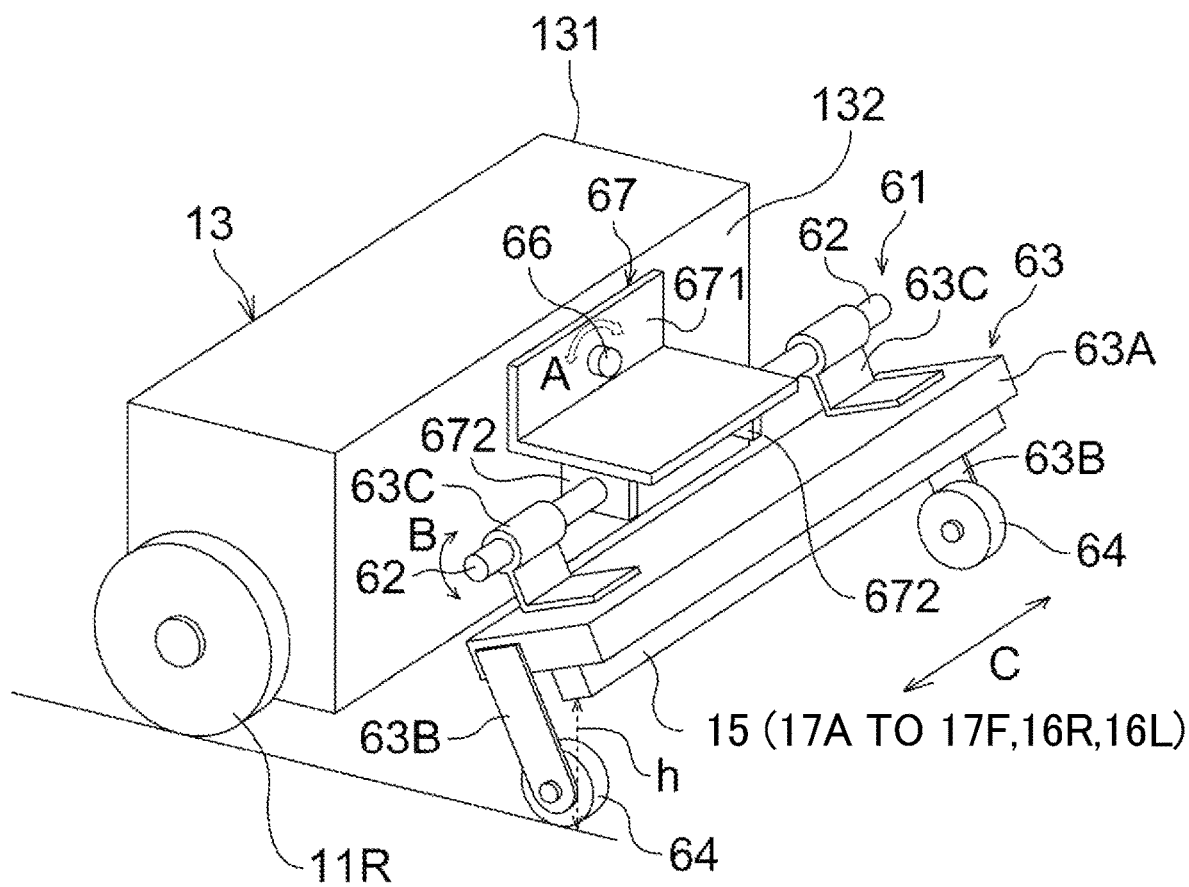
FIG. 15 is a drawing showing a third example for the support mechanism of the optical detection unit in the self-propelled vehicle.

Furthermore, the optical detection unit 15 may be supported by a support device 61 as shown in FIG. 15. In this form, the optical detection unit 15 can be supported by the support device 61 such that the optical detection unit is allowed to swing in the travel direction of the self-propelled vehicle 10 and in the perpendicular direction to the travel direction, and separation distance h between the drive line sensors 17A to 17F and drive line, and separation distance h between the marker sensors 16R, 16L and the marker is maintained constant.

The support device 61 includes 2 support shafts 62 that are in the horizontal direction and perpendicular to the travel direction provided in a housing of the drive assembly 13, a swing frame 63 that is supported by the support shafts 62 and is free to rotate, and a pair of left and right small wheels 64 attached to the lower end of the swing frame 63. The swing frame 63 includes a flat plate-shaped arm unit 63A, support brackets 63C attached to the 2 support shafts 62 that can rotate freely with respect to the 2 support shafts 62 and is connected to the flat plate-shaped arm unit 63A, and legs 63B connected to the sides of the flat plate-shaped arm unit 63A extending downward. The optical detection unit 15 is fixed to the bottom of the flat plate-shaped arm unit 63A. A pair of small wheels 64 that are free to rotate is attached to the lower end of legs 63B.

A shaft 66 and a support bracket 67 that is free to rotate around shaft 66 with respect to housing 131 in the direction of arrow A shown in FIG. 15 is arranged on side 132 of housing 131 of drive assembly 13. Support bracket 67, for example, has a L-shaped flat plate bracket 671 and 2 shaft support brackets 672 attached to the bottom of the flat plate bracket 671. Pivot support bracket 672 supports support shaft 62 such that support shaft 62 can rotate freely.

According to the present configuration, the swing frame 63 and the small wheels 64 rotate in the direction of arrow B around the support shafts 62 and rotates in the direction of arrow A around the shaft 66. Accordingly, flat plate-shaped arm unit 63A with the optical detection unit 15 attached at the bottom rotates in the direction of arrow B according to the difference in elevation of the ground with which the 2 small wheels 64 are in contact, and the separation distance h between the optical detection unit 15 and ground can be maintained almost constant. In addition, the flat plate-shaped arm unit 63A, by rotating in the direction of arrow A can maintain the separation distance h between the optical detection unit 15 and ground almost constant depending on the height difference in direction C along ground with which the 2 small wheels 64 are in contact.

Further, the configuration and processing of the above embodiment explained with reference to FIGS. 1 to 15 is just 1 embodiment of the present disclosure, and is not intended to limit the present disclosure to this configuration and processing.

While the present disclosure has been described in detail with reference to the embodiments thereof, it would be apparent to those skilled in the art the various changes and modifications may be made therein within the scope defined by the appended claims.

What is claimed is:

1. A self-propelled vehicle drive system comprising:
   a drive line that is laid on a road surface and branches from a first direction into a second direction and a third direction;
   a start marker arranged along the drive line at an upstream side of a travel direction with respect to a point where the drive line branches into the second direction and the third direction; and
   a self-propelled vehicle that runs in the travel direction along the drive line and changes the travel direction,
   wherein the self-propelled vehicle includes:
     a drive section that runs the self-propelled vehicle;
     a plurality of drive line sensors that is arranged in a direction intersecting with the travel direction of the self-propelled vehicle, and at a wider range than a width of the drive line, and each detects the drive line;
     a marker sensor that detects the start marker; and
     a control unit that controls the drive section in accordance with a detection output of each of the drive line sensors and the marker sensor,
       wherein before the start marker is detected by the marker sensor, in accordance with the detection output of each of the drive line sensors, the control unit causes the drive section to make the travel direction of the self-propelled vehicle follow the drive line of the first direction, and
       after the start marker is detected by the marker sensor, the control unit nullifies the detection output of the drive line sensors forming a first side group, the first side group being one of two groups formed by dividing all the drive line sensors in the intersecting direction with the drive line as a center, the two groups being the first side group and a second side group, and in accordance with the detection output of the second side group, the control unit causes the drive section to make the travel direction of the self-propelled vehicle follow the drive line branched towards a side of the second side group, the drive line to be followed being one of the two drive lines branched into the second direction and the third direction.

2. The self-propelled vehicle drive system according to claim 1,
   wherein before the start marker is detected by the marker sensor, in accordance with the detection output of each of the drive line sensors, the control unit causes the drive section to run the self-propelled vehicle such that the drive line of the first direction comes closer to a center of a detection range of each of the drive line sensors and causes the drive section to run the self-propelled vehicle along the drive line of the first direction, and
   after the start marker is detected by the marker sensor, the control unit: nullifies the detection output of the first side group; causes the drive section to run the self-propelled vehicle in accordance with the detection output of the second side group; causes the drive section to make the travel direction of the self-propelled vehicle such that the drive line branched towards the second side group to be within the detection range of the second side group; and causes the drive section to make the travel direction of the self-propelled vehicle follow the drive line branched towards the side of the second side group.

3. The self-propelled vehicle drive system according to claim 1,
wherein the control unit sets a weighting in which the detection output of each of the drive line sensors increases as each of the drive line sensors becomes more outward with respect to the arrangement of the drive line sensors in the intersecting direction, and
when the drive line is detected by each of the drive line sensors, the control unit changes the travel direction of the self-propelled vehicle in accordance with magnitude corresponding to the weighting given to the detection output.

4. The self-propelled vehicle drive system according to claim 1, further comprising an end marker arranged along the drive line at the side of the drive line at a downstream side of the travel direction with respect to the point where the drive line branches into the second direction and the third direction,
wherein when the marker sensor detects the end marker after the start marker is detected by the marker sensor, the control unit: releases the nullification of the detection output of the first side group; in accordance with the detection output of each of the drive line sensors, causes the drive section to control the travel direction of the self-propelled vehicle such that the drive line branched to the side of the second side group comes closer to the center of the detection range of each of the drive line sensors; and causes the drive section to make the travel direction of the self-propelled vehicle follow the drive line branched to the side of the second side group.

5. The self-propelled vehicle drive system according to claim 1, wherein when an elapsed time from the detection of the start marker by the marker sensor reaches a prescribed preset time, the control unit: releases the nullification of the detection output of the first side group; in accordance with the detection output of each of the drive line sensors, causes the drive section to control the travel direction of the self-propelled vehicle such that the drive line branched to the side of the second side group comes closer to the center of the detection range of each of the drive line sensors; and causes the drive section to make the travel direction of the self-propelled vehicle follow the drive line branched to the side of the second side group.

6. The self-propelled vehicle drive system according to claim 1,
wherein the marker sensor is one of a plurality of marker sensors and the plurality of marker sensors are arranged, in the intersecting direction, in a wider range than the width of the drive line, and
the plurality of marker sensors is arranged on both sides of the drive line, and after the marker sensors on one side detect the start marker, when the drive line sensors of the first side group detect the drive line that branches towards the first side group in which the detected drive line is one of two drive lines that branches into the second direction and the third direction, the control unit: releases the nullification of the detection output of the first side group; in accordance with the detection output of each of the drive line sensors, causes the drive section to control the travel direction of the self-propelled vehicle such that the drive line branched to the side of the second side group comes closer to the center of the detection range of each of the drive line sensors; and causes the drive section to make the travel direction of the self-propelled vehicle follow the drive line branched to the side of the second side group.

7. The self-propelled vehicle drive system according to claim 1,
wherein the drive section of the self-propelled vehicle includes a pair of left and right drive wheels and drive assemblies, each of which rotationally drives the pair of left and right drive wheels, respectively, and
the control unit causes each of the drive assemblies to change the travel direction of the self-propelled vehicle by controlling the rotational speeds of the pair of left and right drive wheels.

8. The self-propelled vehicle drive system according to claim 7, further comprising:
a drive unit having the drive wheels and the drive assemblies; and
an optical detection unit having the drive line sensors and the marker sensors,
wherein the optical detection unit is installed in the drive unit.

9. The self-propelled vehicle drive system according to claim 8, further comprising a support device that supports the optical detection unit such that a separation distance between the drive line sensors and the drive line and a separation distance between the marker sensors and the start marker are maintained constant.

10. The self-propelled vehicle drive system according to claim 1, wherein each of the drive line sensors is an optical reflective sensor that receives light reflected from the drive line and detects the drive line.

11. A self-propelled vehicle running along a drive line that is laid on a road surface and branches from a first direction into a second direction and a third direction, the self-propelled vehicle comprising:
a drive section that runs the self-propelled vehicle;
a plurality of drive line sensors that is arranged in a direction intersecting with a travel direction of the self-propelled vehicle, and at a wider range than a width of the drive line, and each detects the drive line;
a marker sensor that detects a start marker arranged along the drive line at an upstream side of the travel direction with respect to a point where the drive line branches into the second direction and the third direction; and
a control unit that controls the drive section in accordance with a detection output of each of the drive line sensors and the marker sensor,
wherein before the start marker is detected by the marker sensor, in accordance with the detection output of each of the drive line sensors, the control unit causes the drive section to make the travel direction of the self-propelled vehicle follow the drive line of the first direction, and
after the start marker is detected by the marker sensor, the control unit nullifies the detection output of the drive line sensors forming a first side group, the first side group being one of two groups formed by dividing all the drive line sensors in the intersecting direction with the drive line as a center, the two groups being the first side group and a second side group, and in accordance with the detection output of the second side group, the control unit causes the drive section to make the travel direction of the self-propelled vehicle follow the drive line branched towards a side of the second side group, the drive line to be followed being one of the two drive lines branched into the second direction and the third direction.

12. A drive control method of a self-propelled vehicle using:
- a drive line that is laid on a road surface and branches from a first direction into a second direction and a third direction;
- a start marker arranged along the drive line at an upstream side of a travel direction with respect to a point where the drive line branches into the second direction and the third direction; and
- a self-propelled vehicle that runs in the travel direction along the drive line and changes the travel direction,
- wherein the self-propelled vehicle includes:
- a drive section that runs the self-propelled vehicle;
- a plurality of drive line sensors that is arranged in a direction intersecting with the travel direction of the self-propelled vehicle, and at a wider range than a width of the drive line, and each detects the drive line;
- a marker sensor that detects the start marker; and
- a control unit that controls the drive section in accordance with a detection output of each of the drive line sensors and the marker sensor,
- wherein the drive control method includes:
- a first step of causing the drive section to make the travel direction of the self-propelled vehicle follow the drive line of the first direction in accordance with the detection output of each of the drive line sensors before the start marker is detected by the marker sensor; and
- after the start marker is detected by the marker sensor, a second step of nullifying the detection output of the drive line sensors forming a first side group, the first side group being one of two groups formed by dividing all the drive line sensors in the intersecting direction with the drive line as a center, the two groups being the first side group and a second side group, and in accordance with the detection output of the second side group, causing the drive section to make the travel direction of the self-propelled vehicle follow the drive line branched towards a side of the second side group, the drive line to be followed being one of the two drive lines branched into the second direction and the third direction.

* * * * *